United States Patent

Le Blanc

[15] 3,668,164

[45] June 6, 1972

[54] AQUEOUS RESOLE RESIN COMPOSITION CONTAINING A POLYAMINOALKYL-SUBSTITUTED ORGANOSILOXANE COPOLYMER

[72] Inventor: John R. Le Blanc, Wilbraham, Mass.

[73] Assignee: Monsanto Company, St. Louis, Mo.

[22] Filed: Mar. 4, 1970

[21] Appl. No.: 16,619

Related U.S. Application Data

[63] Continuation-in-part of Ser. No. 647,622, June 21, 1967, abandoned.

[52] U.S. Cl.............................260/29.3, 260/292 M, 260/826
[51] Int. Cl.........................................................C08g 47/04
[58] Field of Search....................260/29.3, 29.2 M, 824, 826

[56] References Cited

UNITED STATES PATENTS

| | | | |
|---|---|---|---|
| 3,215,585 | 11/1965 | Kneipple | 260/29.3 UX |
| 3,355,424 | 11/1967 | Brown | 260/448.2 R X |
| 3,460,981 | 8/1969 | Keil et al. | 260/448.2 N X |
| 2,758,946 | 8/1956 | Spalding et al. | 260/826 |
| 2,894,931 | 7/1959 | Somerville et al. | 260/826 |
| 3,380,877 | 4/1968 | Smucker et al. | 260/29.3 |
| 3,404,198 | 10/1968 | Guyer | 260/29.3 |

*Primary Examiner*—Donald J. Arnold
*Assistant Examiner*—James B. Lowe
*Attorney*—John W. Klooster, Richard W. Sternberg, James C. Logomasini and Neal E. Willis

[57] ABSTRACT

This application describes a stable, aqueous catalyst system adapted to be admixed with an aqueous resole resin and thereafter to accelerate resin cure when the product mixed resin system is dried and thermoset. The catalyst is especially useful when using phenolic resins for treating paper employed in the manufacture of water-repellent resin treated paper.

1 Claim, No Drawings

AQUEOUS RESOLE RESIN COMPOSITION CONTAINING A POLYAMINOALKYL-SUBSTITUTED ORGANOSILOXANE COPOLYMER

RELATED APPLICATION

This application is a continuation-in-part of my copending U.S. application, Ser. No. 647,622, filed June 21, 1967 now abandoned.

BACKGROUND

Although liquid phenolic resole resins are well known to be self-curing when first dried and then exposed to elevated temperature conditions, such resins typically by themselves do not have cure rates which are rapid enough to enable these resins to be used in many applications, for example, in treating paper under the high speed processing conditions, such as are commonly employed in the manufacture of laminates. Therefore, to accelerate cure rates, it is common to add to such a resin agents commonly termed "catalysts" in the art which operate to shorten cure or thermosetting times in dried resin systems, such as resin impregnated into paper.

When catalyzed liquid resole resin systems are used for paper treatment, and the treated paper is thereafter dried and thermoset, there generally results a resin treated sheet which is relatively stable towards water and moisture. However, such a thermoset resin treated sheet product does suffer from a tendency to absorb moisture by a wicking action over a period of time. Such wicking action eventually tends to reduce treated sheet rigidity and strength characteristics.

In order to minimize such wicking action in such resin treated sheets, those skilled in the art of phenolic resins know that certain additives can be combined with a liquid resole treating resin to minimize moisture absorption in the product treated, thermoset sheets. However, there are severe problems in using such an additive with such a resin in paper treatment, particularly when a resin system with water repellent additive is to be used under high speed treating conditions. One problem is that commonly either the water repellent additive tends to precipitate resin or catalyst or both from their respective starting solutions, or, alternatively, the water repellent additive, itself, is precipitated from solution by resin or catalyst or both.

A major disadvantage of a solution admixture of resole, catalyst and water repellent additive is thus its incompatibility and instability during the periods required for storage and transportation, thus, requiring the resin user to prepare the solution admixture just prior to using it. Accordingly, this disadvantage requires that the various components employed be separately packaged.

Another problem is that commercial treaters do not wish to use their time, equipment, personnel, etc. in a separate pre-mix operation to add a water repellent additive to a resin system immediately prior to paper treatment, such as might be necessary particularly when the resin user is employing a multicomponent resin system, such as a two-package liquid resole with liquid catalyst system therefor. A multipackage product is burdensome and expensive both to the producer and the consumer. It has become a commercial necessity in the resin industry to provide a product in not more than two packages.

There has now been discovered a particular class of additives which can be dissolved in a liquid catalyst system and used to impart improved water resistance to paper treated with a thermoset catalyzed resole resin and which overcomes the disadvantages associated with known prior art water-repellent additives. This additive, surprisingly and unexpectedly, has been found to be compatible with a certain liquid catalyst system suitable for use in catalyzing liquid resole resins so that, when dissolved in such catalyst system, the product system remains stable for extended periods of time thereafter. In addition when such product liquid catalyst system is admixed with a liquid resole resin, the product system has an excellent "bench-life" during which resin, catalyst and water-repellent additive remain in solution without precipitation. When such product liquid resin system is dried and thermoset, the thermoset resin displays excellent (expected) quick cure characteristics and excellent (espected) water-repellent characteristics. Thus, it is now possible to provide to a user of liquid resole resins and liquid catalyst systems therefor a resin system which contains a "built-in" moisture repellent additive.

SUMMARY

The present invention relates to an aqueous catalyst solution having excellent stability and adapted for accelerating the cure rate of liquid resole resin systems. This catalyst solution is adapted to be mixed with phenolic aqueous resole resin solutions and to impart to the resulting mixed system not only quick-curing capacity when dried (to remove volatiles) and exposed to thermosetting conditions (elevated temperatures for short times), but also water repellency against moisture pick up through wicking action for indefinite periods of time. This catalyst system comprises on a 100 weight per cent basis:

A. from about 10 to 20 weight per cent (dry weight basis) of an ammonium salt of a strong inorganic acid, B. from about 30 to 50 weight per cent (dry weight basis) of urea, C. from about 1 to 15 weight per cent (dry weight basis) of at least one member from the class of soluble polyaminoalkyl-substituted organosiloxane copolymers. Such organosiloxane copolymers are the reaction product of:

1. At least one compound selected from the group consisting of:

A. silanes of the formula $R''_x(Z_nR')Si(OR)_{3-x}$     (I)

where:

$x$ is an integer of from 0 to 2 inclusive, each R is an alkyl radical of less than four carbon atoms, R' is an aliphatic hydrocarbon radical containing a number of carbon atoms selected from the group consisting of one, three, four, and five carbon atoms and having a valence of $n+1$, where $n$ is an integer of from 1 to 3 inclusive, Z is a monovalent radical attached to R' by a carbon-nitrogen bond and is composed of carbon, nitrogen and hydrogen atoms, and contains at least 2 amine groups in which the nitrogen atoms are attached only to substituents selected from the group consisting of hydrogen, and aliphatic hydrocarbon, cycloaliphatic hydrocarbon and aromatic hydrocarbon radicals, the nitrogen in Z being present only in said amine groups, the ratio of carbon atoms to nitrogen atoms in the substituent —$R'Z_n$ being less than 6:1, and each R'' is a monovalent hydrocarbon radical free of aliphatic unsaturation, and B. partial hydrolyzates formed by mixing (A) with up to 60 percent of its theoretical equivalent of water, with 2. At least one organosiloxane of the average general formula $$R_y'''Si(OH)_mO_{4-m-y/2}$$     (II)

where each

R''' is selected from the group consisting of monovalent hydrocarbon radicals and halogenated monovalent hydrocarbon radicals, $m$ has a positive average value up to and including 2, $y$ has an average value of from 1 to 2.5 inclusive, and the sum of $y+m$ has an average value up to and including 3, the value of $m$ being such that the organosiloxane (2) contains at least 1.0 percent by weight of hydroxyl groups, by contacting (1) and (2) in liquid phase.

Such copolymers are described in the U.S. Pat. No. 3,355,424 and U.S. Pat. No. 3,460,981.

The aqueous catalyst solutions of this invention have, as indicated above, excellent stability by which reference is had that such solutions can be stored for periods of about 3 months and sometimes more at room temperature conditions without showing any substantial precipitation of solid matter from such solution.

In use, one admixes an aqueous catalyst solution of this invention with an aqueous resole solution. Typically, such solutions contains, at the time of catalyst solution addition thereto, from about 10 to 40 total weight per cent resin solids (dry weight basis). Since as made and supplied such a resin commonly may contain from about 40 to 75 weight per cent total resin solids, it is usual to dilute such resin concentrate with water to produce a diluted product solution having the above-indicated resins solids content before using the resin solution for substrate treatment, such as paper sheet impregnation. No particular criticality in the minimum or maximum resin solids content present in a starting solution exists, so far as using an aqueous catalyst solution of this invention to promote cure rate of such a starting resole resin solution; selection of a starting solution with a specific resins solids content depends upon the particular use situation and the wishes of the user, as those skilled in the art appreciate.

Commonly, the amount of catalyst solution added to resin solution varies widely, but usually is in the range of from about 3 to 30 total parts by weight catalyst solids for each 100 parts by weight of total resole resin solids (10 to 20 parts total catalyst solids per 100 parts total resin solids being preferred).

DETAILS

Any aqueous solution of resole-type phenol-aldehyde resin can be employed in this invention as the starting resin. The phenol-aldehyde resin employed can be prepared by any of the various condensation techniques by reacting from 1.0 to 4.0 mols of an aldehyde with each mol of phenol. Preferably, the resins are prepared by the condensation reaction of about 1.1 to 3.5 mols of formaldehyde per mol of phenol using an alkaline catalyst carried out under liquid (aqueous) phase conditions at a temperature of about 50° to 70° C. (preferably about 60° to 65° C.) while maintaining a pH of about 7.0 to 11.0 (preferably about 8.0 to 9.5). At the end of the reaction, the pH may be adjusted to 5.0 to 7.0 with hydrochloric acid. The product resin is recovered in a liquid aqueous medium. Any phenol capable of condensation with an aldehyde to form resins may be used, such as alkyl substituted phenols, cresol, xylenol, and the like. However, phenol itself is the phenolic body presently preferred. Any aldehyde, or aldehyde-producing materials which will condense with a phenol to form resins, may be used, such as acetaldehyde, butyraldehyde, benzaldehyde, furfural aldehyde, and the like. However, formaldehyde in aqueous solution is the aldehyde presently preferred. The phenol-aldehyde resole resins may be used in unmodified form or may be modified by admixture or coreaction with materials such as dicyandiamide, urea, melamine, substituted melamines and the like, as those skilled in the art of resole resins well appreciate.

A typical starting resole resin solution has the following physical properties:

| Property | Typical broad range | Preference |
| --- | --- | --- |
| 1. Owens solids content | 40–75 weight % | 55–65 weight % |
| 2. pH | 4.0–9.0 | 6.5–8.0 |
| 3. Free formaldehyde content | 0.6–10.0 weight % | 1.5–6.5 weight % |
| 4. Water dilutability | 2:1 to greater than 50:1 | 5:1 to 25:1 |

Note that water dilutability is a measure of molecular weight for this resin since the higher the molecular weight, the less the resin dilutability. For present purposes, dilutability is measured by adding the indicated volumes of water to one volume of resin at 25° C. to the resin concentrate as manufactured.

The aqueous liquid catalyst solutions of the present invention may be prepared by any convenient technique. For example, one convenient procedure involves first dissolving ammonium chloride and urea in water in the concentrations above indicated for such materials using room temperature conditions since the dissolution of ammonium chloride and urea is an endothermic phenomenon, the resulting solution is usually at room temperature or below. At this point, the dimethyl polysiloxane is added to the solution. Preferably, the dimethyl polysiloxane is already dissolved in a lower alkanol (the latter being completely miscible with water in all proportions). In general, a dimethyl polysiloxane of formula (1) is added at room temperature conditions or below to a previously prepared solution of ammonium salt and urea. The resulting solution of dimethyl polysiloxane, urea and ammonium salt of strong inorganic acid is then ready for use in accordance with the teachings of the present invention.

To use a liquid catalyst of this invention, one simply admixes such with a desired resole resin solution as described above until a uniform mixture results. Simple stirring is usually sufficient as at room temperature conditions. Other liquid diluents miscible with water may be present such as isopropanol, methanol, etc.

After catalyst and resin are admixed, the system is ready for use in conventional ways. Typical applications include bonding together of particulate bodies, such as sand, aluminum oxide, insulating material, glass fibers, or the like, as well as the treatment (as by impregnation, coating, spraying, dipping, or the like) of preformed substrates such as those in sheet form, especially cellulosic sheets like paper.

EMBODIMENTS

The following examples are set forth to more fully describe the invention and such are not intended to impose limitations upon the invention concept. Where parts are mentioned, they are parts by weight.

EXAMPLE 1

PART A

To a reaction vessel fitted with an agitator, heater and condenser for refluxing, under vacuum conditions, add 100 parts of phenol, 200 parts of 50 percent formalin and 3.5 parts of calcium hydroxide to provide a pH of about 8.0–9.0. The reaction is carried out at a temperature of about 60°–62° C. for about 3 hours. The product is then cooled to about 30° C. and the pH is adjusted to 6.0–7.0 with hydrochloric acid. The resin is then cooled to room temperature. The reaction product is found to be infinitely water dilutable in that 24 or more volumes of water can be mixed with one volume of the resin at a temperature of 24°–26° C. without causing the mixture to exhibit haziness or milkiness.

PART B

Portions of the resin of Part A are individually mixed with designated quantities of additive materials and each admixture is diluted with water to provide solutions containing about 35 percent solids. The solutions are allowed to stand 10 hours at 25° C., which is the normal shelf-time for a commercial resin, and then observed for stability. The particular additives and quantities thereof are listed in Table 1 below.

TABLE 1

| Solution | Additive | Quantity weight % of resin | Stability |
| --- | --- | --- | --- |
| a | dimethyl polysiloxane | 1.5 | polysiloxane has separated from resin solution |
| b | ammonium chloride | 4.0 | resin has advanced and |
|  |  | 12.0 | separated from solution |

| | | | |
|---|---|---|---|
| c | dimethyl polysiloxane | 1.1 | polysiloxane has separated from solution. |
| | ammonium chloride | 3.0 | |
| | urea | 10.5 | Resin has advanced and separated from solution |

PART C

An aqueous solution of resin-curing catalyst and water-repellent inducive materials are prepared, allowed to stand one month at 50° C. and then observed for stability. The particular catalyst and material tested and quantities thereof are listed in Table 2.

TABLE 2

| Solution | Catalyst (parts) | Materials (parts) | Water parts | Stability |
|---|---|---|---|---|
| d | ammonium chloride (16) urea (44) | dimethyl polysiloxane (10) | 40 | OK |

The polysiloxane used is prepared as described in Example 1 of U.S. Pat. No. 3,355,424 (see column 8, lines 58 through 66).

The above example shows that an aqueous solution of a phenol-aldehyde resin and a curing catalyst therefor and/or a water-repellent inducive material is not stable for a practical period of time due to presence of catalyst causing substantial advancement of the resin and/or separation of the polysiloxane, but that an aqueous solution of a resin curing catalyst and a water-repellent inducive material is stable for an extended period of time.

Protective colloidals, such as polyvinyl alcohols, can be employed in small quantities, i.e. 0.5 to 5 parts, with the resin catalyst-water-repellent material admixture to further enhance the stability thereof.

EXAMPLES 2 and 3

Using the procedure of Example 1, Part C, two additional catalyst systems are prepared as shown in Table 3 below. When each of these materials is admixed with the resin of Part A of Example 1 in the same proportion as used with the catalyst of Example 1, Part C, and then thereafter the mixture is used to treat paper by saturation followed by drying and curing, there is produced a treated sheet having water resistant properties.

Each of the catalyst systems of Examples 2 and 3 is observed to have a shelf-like in excess of one month at room temperature conditions.

TABLE 3

| Ex. No. | Catalyst (parts) | Materials (parts) | Water parts | Stability |
|---|---|---|---|---|
| 2 | ammonium sulfate (10) urea (40) | dimethyl polysilicone (8) | 42 | OK |
| 3 | ammonium chloride (12) urea (42) | dimethyl polysilicone (12) | 44 | OK |

What is claimed is:

1. An aqueous solution of a curable phenolic-aldehyde resole resin admixed with a catalyst system adapted to accelerate the cure rate of the resole resin and imparting water repellancy to the product cured resin, said catalyst system comprising on a 100 weight percent basis:
   A. from about 10 to 20 weight percent (dry weight basis) of an ammonium salt of a strong inorganic acid selected from the group consisting of ammonium sulfate and ammonium chloride,
   B. from about 30 to 50 weight percent (dry weight basis) of urea,
   C. from about 1 to 15 weight percent (dry weight basis) of a polyaminoalkyl-substituted organosiloxane copolymer, and
   D. the balance up to 100 weight percent of any given such catalyst system being water.

wherein said aqueous solution of a phenol-aldehyde resin contains from about 10–75 weight percent total resin solids admixed with from about 3 to 30 total parts by weight of said catalyst solids for each 100 parts by weight of total phenol-aldehyde resole resin solids, and wherein said polyaminoalkyl-substituted organosiloxane copolymer is the reaction of product of:

1. a compound selected from the group consisting of:
   A. silanes of the formula $R''_x(Z_nR')Si(OR)_{3-x}$    (I)

where:
   $x$ is an integer of from 0 to 2 inclusive, each R is an alkyl radical of less than four carbon atoms,
   $R'$ is an aliphatic hydrocarbon radical containing a number of carbon atoms selected from the group consisting of 1, 3, 4 and 5 carbon atoms and having a valence of $n+1$, where $n$ is an integer of from 1 to 3 inclusive,
   Z is a monovalent radical attached to $R'$ by a carbon-nitrogen bond and is composed of carbon, nitrogen and hydrogen atoms, and contains at least 2 amine groups in which the nitrogen atoms are attached only to substituents selected from the group consisting of hydrogen, and aliphatic hydrocarbon, cycloaliphatic hydrocarbon and aromatic hydrocarbon radicals, the nitrogen in Z being present only in said amine groups, the ratio of carbon atoms to nitrogen atoms in the substituent — $R'Z_n$ being less than 6:1, and each $R''$ is a monovalent hydrocarbon radical free of aliphatic unsaturation, and
   B. partial hydrolyzates formed by mixing (A) with up to 60 percent of its theoretical equivalent of water, with
2. a organosiloxane of the average general formula $$R_y'''Si(OH)_mO_{4-m-y/2} \qquad (II)$$

where each
   $R'''$ is selected from the group consisting of monovalent hydrocarbon radicals and halogenated monovalent hydrocarbon radicals,
   $m$ has a positive average value up to and including 2,
   $y$ has an average value of from 1 to 2.5 inclusive, and the sum of
   $y+m$ has an average value up to and including 3, the value of $m$ being such that the organosiloxane (2) contains at least 1.0 percent by weight of hydroxyl groups, by contacting (1) and (2) in liquid phase.

* * * * *